US007178619B2

(12) United States Patent
Oono

(10) Patent No.: US 7,178,619 B2
(45) Date of Patent: Feb. 20, 2007

(54) ELECTRICALLY POWERED VEHICLE DRIVE CONTROL DEVICE AND ELECTRICALLY POWERED VEHICLE DRIVE CONTROL METHOD

(75) Inventor: Yoshinori Oono, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 135 days.

(21) Appl. No.: 10/938,582

(22) Filed: Sep. 13, 2004

(65) Prior Publication Data

US 2005/0082096 A1 Apr. 21, 2005

(30) Foreign Application Priority Data

Oct. 15, 2003 (JP) ............... 2003-354644

(51) Int. Cl.
*B60K 1/00* (2006.01)
*B60W 10/08* (2006.01)
*B60W 10/18* (2006.01)

(52) U.S. Cl. .................. 180/65.2; 192/219.4
(58) Field of Classification Search ............ None
See application file for complete search history.

(56) References Cited

U.S. PATENT DOCUMENTS

| 3,827,024 | A | * | 7/1974 | Anderson et al. ......... 340/463 |
| 4,229,663 | A | * | 10/1980 | Sibley .................. 307/9.1 |
| 5,396,968 | A | | 3/1995 | Hasebe et al. |
| 5,667,282 | A | * | 9/1997 | Kim .................. 192/222 |
| 6,149,544 | A | * | 11/2000 | Masberg et al. ......... 180/65.2 |
| 6,155,364 | A | * | 12/2000 | Nagano et al. ......... 180/65.2 |
| 6,361,469 | B1 | * | 3/2002 | Roder et al. .............. 188/69 |
| 6,589,134 | B2 | * | 7/2003 | Williams et al. ........ 192/219.4 |
| 6,966,866 | B2 | | 11/2005 | Ando et al. |
| 2004/0055799 | A1 | * | 3/2004 | Atarashi et al. .......... 180/65.2 |
| 2004/0122563 | A1 | * | 6/2004 | Okada et al. .............. 701/1 |

FOREIGN PATENT DOCUMENTS

| JP | U-63-119165 | 8/1988 |
| JP | A-4-63750 | 2/1992 |
| JP | A 5-278483 | 10/1993 |
| JP | A-2001-213288 | 8/2001 |
| JP | A-2003-237550 | 8/2003 |
| JP | A-2003-247438 | 9/2003 |

* cited by examiner

*Primary Examiner*—Rodney H. Bonck
(74) *Attorney, Agent, or Firm*—Oliff & Berridge, PLC

(57) ABSTRACT

A vehicle including an electrically powered machine, a parking gear mechanically connected to the electrically powered machine, a parking lock mechanism that locks the parking gear, a sensor that detects a rotor position of the electrically powered machine, and a controller that reads the rotor position when a parking range is selected and judges, on the basis of a change in the rotor position, whether a failure has occurred in the parking lock mechanism.

25 Claims, 11 Drawing Sheets

ELECTRICALLY POWERED VEHICLE DRIVE CONTROL DEVICE AND ELECTRICALLY POWERED VEHICLE DRIVE CONTROL METHOD

INCORPORATION BY REFERENCE

The disclosure of Japanese Patent Application No. 2003-354644 filed on Oct. 15, 2003, including the specification, drawings and Abstract, is incorporated herein by reference in its entirety.

BACKGROUND OF THE INVENTION

1. Field of Invention

The invention relates to an electrically powered vehicle drive control device and an electrically powered vehicle drive control method.

2. Description of Related Art

There exists a hybrid type vehicle as an electrically powered vehicle with a vehicle drive device. The vehicle drive device transmits a part of the engine torque to an electric generator (electric-generator motor) and the remainder of the engine torque to driving wheels. The vehicle drive device includes a planetary gear unit that serves as a differential rotation unit provided with a sun gear, a ring gear, and a carrier. The carrier is connected to an engine; the ring gear, a drive motor, and driving wheels are connected together; and the sun gear is connected to the electric generator. Rotation output from the ring gear and the drive motor is thus transmitted to the driving wheels to generate a driving force.

In the vehicle drive device, inverters are arranged between the drive motor and a drive-motor control device. The inverters are driven according to a drive signal forwarded from the drive-motor control device in order to receive direct current from a battery, generate currents of U-phase, V-phase, and W-phase and supply currents of the respective phases to the drive motor. Therefore, the inverters comprise, for example, six transistors as switching elements. The respective transistors are united pair by pair to constitute transistor modules (IGBT) of the respective phases. Accordingly, when a drive signal is forwarded to the respective transistors in a predetermined pattern, the transistors are made ON and OFF to generate currents of the respective phases.

A drive-motor rotating speed sensor is used to detect a rotating speed of the drive motor, that is, a drive-motor rotating speed. For example, a drive-motor torque is controlled on the basis of the drive-motor rotating speed.

By the way, with the hybrid type vehicle constructed in the above manner, a forward range, a backward range, a neutral range, and a parking range can be selected by manipulating a shift lever. When the parking range is selected, the driving wheels are locked to maintain the hybrid type vehicle in a stopped state (for example, see JP-A-5-278483).

Therefore, the ring gear is formed integral with a parking gear. When a driver manipulates the shift lever to select the parking range, a parking lock mechanism is actuated and a pawl with a detent, arranged to be able to swing, is caused to engage with the parking gear to lock the parking gear. The driving wheels are thus locked.

SUMMARY OF THE INVENTION

With the conventional vehicle drive device, however, the driving wheels cannot be locked when failure occurs in the parking lock mechanism. Hereupon, whether a failure has occurred in the parking lock mechanism is judged on the basis of a sensor output of a shift position sensor when the shift lever is manipulated, and a sensor output of a rotating speed sensor that detects a rotating speed of the drive motor.

When a rotor of the drive motor rotates at a low speed, however, it is not possible to correctly detect a rotating speed of the drive motor and to surely detect that a failure has occurred in the parking lock mechanism.

The invention thus provides an electrically powered vehicle drive control device capable of surely detecting the generation of a failure when a failure has occurred in a parking lock mechanism, and an electrically powered vehicle drive control method.

Therefore, the invention, according to an exemplary aspect, includes a vehicle with an electrically powered machine, a parking gear mechanically connected to the electrically powered machine, a parking lock mechanism that locks the parking gear, a sensor that detects a rotor position of the electrically powered machine, and a controller that reads the rotor position when a parking range is selected and judges, on the basis of a change in the rotor position, whether a failure has occurred in the parking lock mechanism.

The invention, according to another exemplary aspect, includes a method of operating a vehicle with the steps of detecting a rotor position of an electrically powered machine, reading the rotor position when a parking range is selected, and judging, based on a change in the rotor position, whether a failure has occurred in a parking lock mechanism that locks a parking gear mechanically connected to the electrically powered machine.

The invention, according to another exemplary aspect, includes a vehicle control device with a controller that reads a rotor position of an electrically powered machine when a parking range is selected, and judges, based on a change in the rotor position, whether a failure has occurred in a parking lock mechanism that locks a parking gear mechanically connected to the electrically powered machine.

For the purposes of this disclosure, the means discussed below may be considered operations that are performed by a controller. Further, in some cases as defined in the specification, the means may include other elements. Alternatively, in some cases as defined below in the specification, device and means may be considered synonyms.

BRIEF DESCRIPTION OF THE DRAWINGS

Various embodiments of the invention will be described with reference to the drawings, wherein.

DETAILED DESCRIPTION OF PREFERRED EMBODIMENTS

An embodiment of the invention will be described with reference to the drawings. In addition, a hybrid type vehicle as an electrically powered vehicle will be described.

Figure 1:
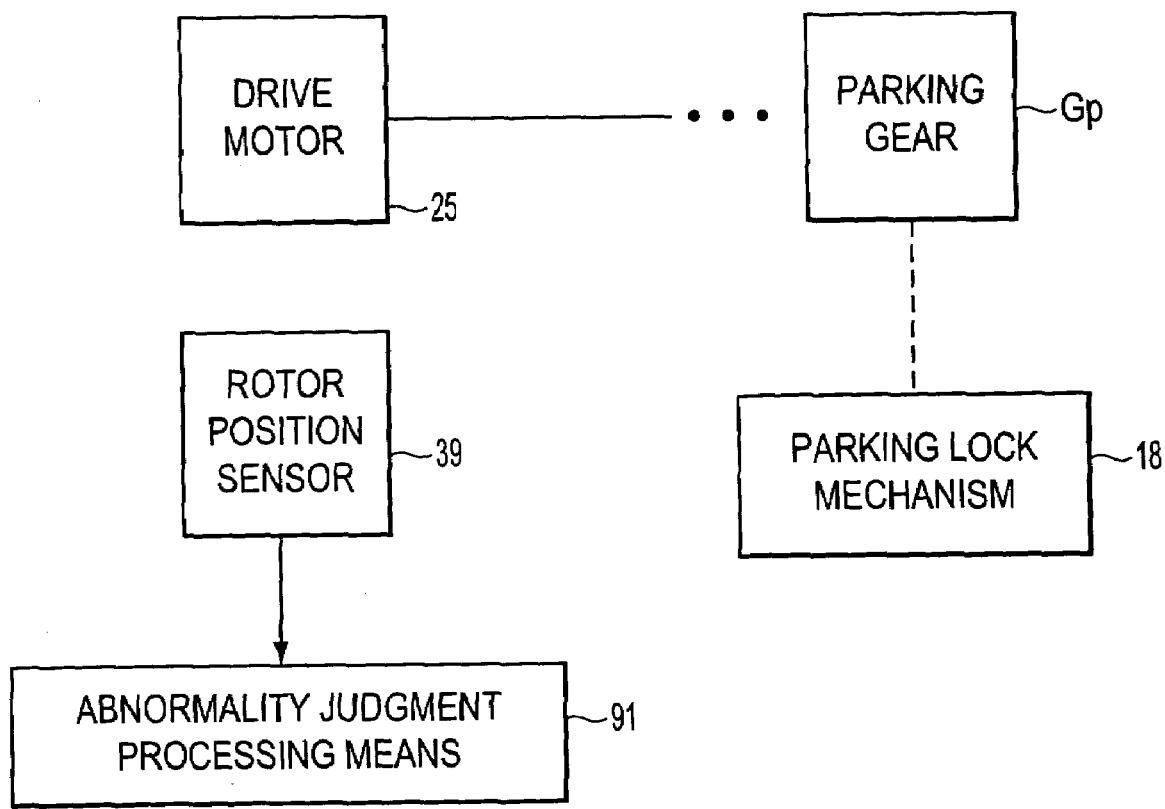
FIG. 1 is a functional block diagram of an electrically powered vehicle drive control device according to an embodiment of the invention.

FIG. 1 is a functional block diagram of an electrically powered vehicle drive control device according to an embodiment of the invention.

In the figure, the reference numeral 25 denotes a drive motor as an electrically powered machine, Gp a parking gear mechanically connected to the drive motor 25, 18 a parking lock mechanism that locks the parking gear Gp, 39 a rotor position sensor serving as a rotor position detection unit that detects a rotor position of the drive motor 25, and 91 a fail judgment processing means that reads the rotor position when a parking range is selected, and judges whether failure has occurred in the parking lock mechanism 18 on the basis of a change in the rotor position.

Figure 2:
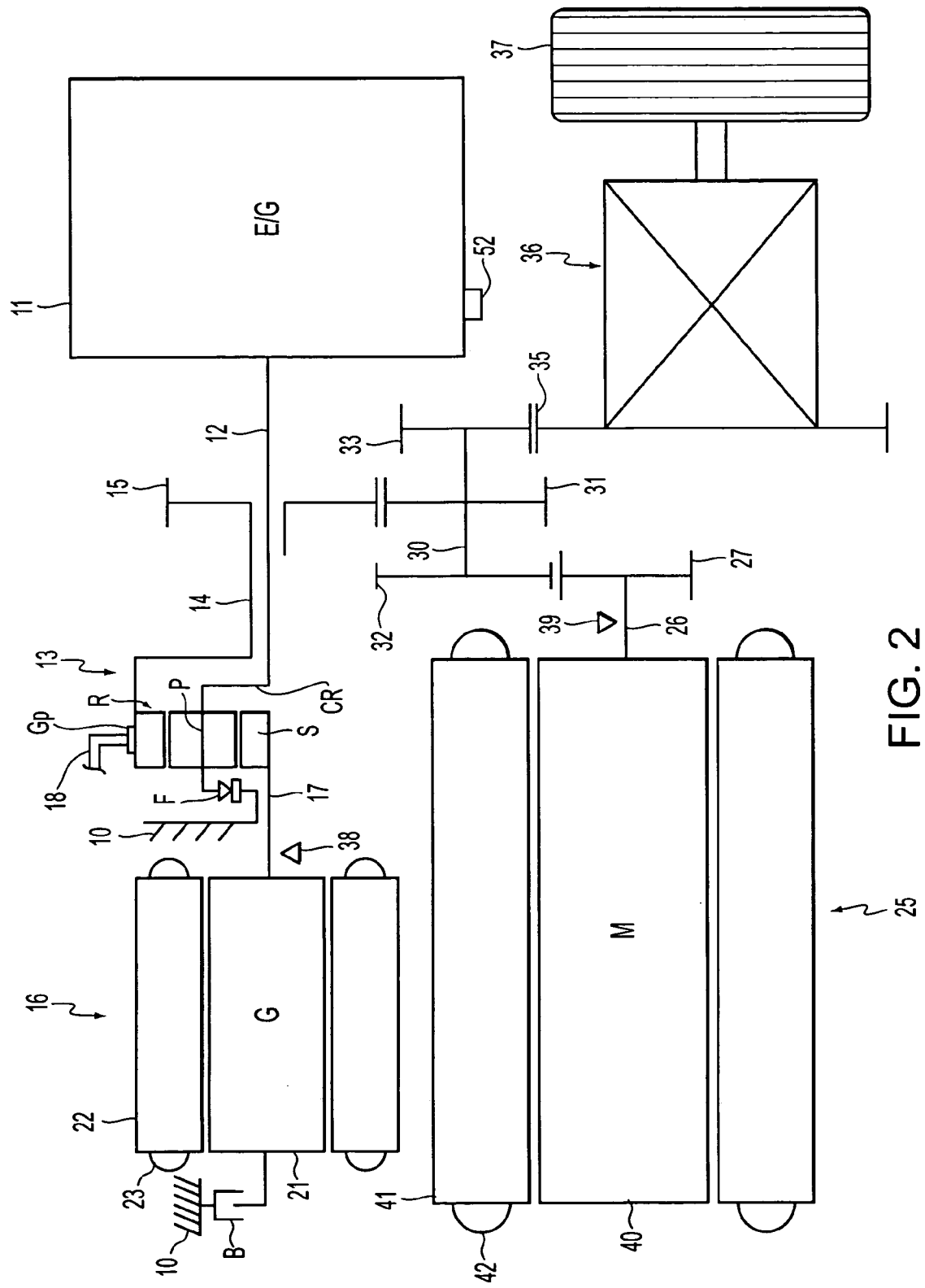
FIG. 2 is a conceptional view showing a hybrid type vehicle according to the embodiment of the invention.

Next, a hybrid type vehicle will be described. FIG. 2 is a conceptional view showing a hybrid type vehicle according to the embodiment of the invention.

In the figure, the reference numeral 11 denotes an engine (E/G) arranged on a first axis, 12 an output shaft arranged on the first axis to output rotation generated by driving the engine 11, 13 a planetary gear unit arranged on the first axis to serve as a differential unit that changes the speed of rotation input via the output shaft 12, 14 an output shaft arranged on the first axis to output rotation after a speed has been changed in the planetary gear unit 13, 15 a first counter drive gear fixed to the output shaft 14 to serve as an output gear, and 16 an electric generator (G) arranged on the first axis and connected to the planetary gear unit 13 via a transmission shaft 17. The electric generator 16 being further connected mechanically to the engine 11 to afford differential rotation, and serving as a first electrically powered machine. Also, the electric generator 16 is connected mechanically to driving wheels 37 as traveling wheels.

The output shaft 14 is in the form of a sleeve and arranged to surround the output shaft 12. Also, the first counter drive gear 15 is arranged toward the engine 11 from the planetary gear-unit 13.

The planetary gear unit 13 comprises at least a sun gear S as a first differential element, a pinion P to mesh with the sun gear S, a ring gear R as a second differential element to mesh with the pinion P, and a carrier CR as a third differential element to rotatably support the pinion P. The sun gear S is connected to the electric generator 16 via the transmission shaft 17. The ring gear R is connected to a drive motor (M) 25 as a second electrically powered machine which is arranged on a second axis parallel to the first axis. The ring gear R is also connected mechanically to the engine 11 and the electric generator 16 in a manner to afford differential rotation, and to the driving wheels 37 via the output shaft 14 and a predetermined gear train. The carrier CR is connected to the engine 11 via the output shaft 12. The drive motor 25 is connected mechanically to the driving wheels 37. Further, a one-way clutch F is arranged between the carrier CR and a casing 10 of a hybrid type vehicle drive device as a vehicle drive device. The one-way clutch F is made free when rotation in a forward direction is transmitted to the carrier CR from the engine 11, and locked when rotation in a reverse direction is transmitted to the carrier CR from the electric generator 16 or the drive motor 25 to stop rotation of the engine 11 so that rotation in the reverse direction is prevented from being transmitted to the engine 11. Accordingly, when the electric generator 16 is driven in a state, in which driving of the engine 11 is stopped, the one-way clutch F applies a reaction force on torque transmitted from the electric generator 16. In addition, in place of the one-way clutch F, a brake (not shown) as stoppage means can be arranged between the carrier CR and the casing 10.

The electric generator 16 comprises a rotor 21 fixed to the transmission shaft 17 and arranged to be rotatable, a stator 22 arranged around the rotor 21, and a coil 23 wound round the stator 22. The electric generator 16 receives rotation transmitted via the transmission shaft 17 to generate electricity. The coil 23 is connected to a battery (not shown) to supply direct current to the battery. A electric-generator brake B is arranged between the rotor 21 and the casing 10, and engagement of the electric-generator brake B causes fixation of the rotor 21 to enable mechanically stopping rotation of the electric generator 16.

Also, the reference numeral 26 denotes an output shaft, which is arranged on the second axis and to which rotation of the drive motor 25 is output, and 27 a second counter drive gear fixed to the output shaft 26 to serve as an output gear. The drive motor 25 comprises a rotor 40 fixed to the output shaft 26 and arranged to be rotatable, a stator 41 arranged around the rotor 40, and a coil 42 wound round the stator 41.

U-phase, V-phase, and W-phase alternating currents supplied to the coil 42 causes the drive motor 25 to generate a drive-motor torque TM. Thus the coil 42 is connected to the battery and direct current from the battery is converted into electric currents of the respective phases to be supplied to the coil 42.

In order to rotate the driving wheels 37 in the same rotating direction as that of the engine 11, a counter shaft 30 is arranged on a third axis parallel to the second axis, and a first counter driven gear 31, and a second counter driven gear 32 having a greater number of teeth than that of the first counter driven gear 31 are fixed to the counter shaft 30. The first counter driven gear 31 meshes with the first counter drive gear 15 and the second counter driven gear 32 meshes with the second counter drive gear 27. Rotation of the first counter drive gear 15 is thus reversed to be transmitted to the first counter driven gear 31 and rotation of the second counter drive gear 27 is reversed to be transmitted to the second counter driven gear 32.

Further, a differential pinion gear 33 having a lower number of teeth than that of the first counter driven gear 31 is fixed to the counter shaft 30.

A differential device 36 is arranged on a fourth axis parallel to the first to third axes, and a differential ring gear 35 of the differential device 36 meshes with the differential pinion gear 33. Accordingly, rotation transmitted to the differential ring gear 35 is distributed by the differential device 36 to be transmitted to the driving wheels 37. In this manner, not only rotation generated by the engine 11 can be transmitted to the first counter driven gear 31 but also rotation generated by the drive motor 25 can be transmitted to the second counter driven gear 32, so that driving of the engine 11 and the drive motor 25 enables a hybrid type vehicle to travel.

By the way, with the hybrid type vehicle constructed in the manner described above, a shift lever (not shown) as a gearshift member is operated to enable the selection of a forward range, a backward range, a neutral range, and a parking range. When the parking range is selected, the driving wheels 37 are locked and the hybrid type vehicle is maintained in a stopped state. Therefore, the parking gear Gp is formed integral with the ring gear R. When a driver thus manipulates the shift lever to select the parking range, the parking lock mechanism 18 is actuated and a detent of a pawl (not shown), arranged swingably to serve as an engaging member, is caused to engage with the parking gear Gp to lock the parking gear Gp, thus locking the driving wheels 37. According to the embodiment, while the parking gear Gp is formed integral with an outer peripheral surface of the ring gear R and the drive motor 25 and the parking gear Gp are connected mechanically to each other, the parking gear Gp can be formed in a predetermined location on the output shaft 14. For example, adjacent to the first counter drive gear 15. Further, by forming the parking gear Gp on the counter shaft 30, or adjacent to the differential ring gear 35, the drive motor 25 and the parking gear Gp can be connected mechanically to each other.

In addition, the reference numeral 38 denotes a rotor-position sensor, such as a resolver serving as a first rotor-position detection unit that detects a position of the rotor 21, that is, a rotor position $\theta G$. Reference numeral 39 denotes a rotor-position sensor, such as resolver, serving as a second rotor-position detection unit that detects a position of the rotor 40, that is, a rotor position $\theta M$. A rotor position $\theta G$ as detected is forwarded to a vehicle control device (not shown) and an electric-generator control device (not shown), and a rotor position $\theta M$ is forwarded to the vehicle control device and a drive-motor control device (not shown). In addition, the reference numeral 52 denotes an engine rotating speed sensor serving as an engine rotating speed detection unit that detects the rotating speed of the engine 11, that is, an engine rotating speed NE. The engine rotating speed NE as detected is forwarded to the vehicle control device and an engine control device (not shown).

Figure 3:
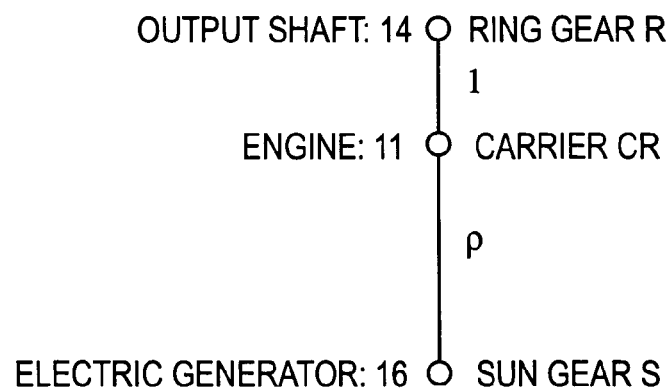
FIG. 3 is a view illustrating an action of a planetary gear unit in the embodiment of the invention.
Figure 4:
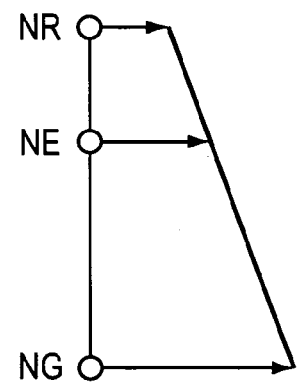
FIG. 4 is a vehicle speed diagram at the time of normal traveling in the embodiment of the invention.
Figure 5:
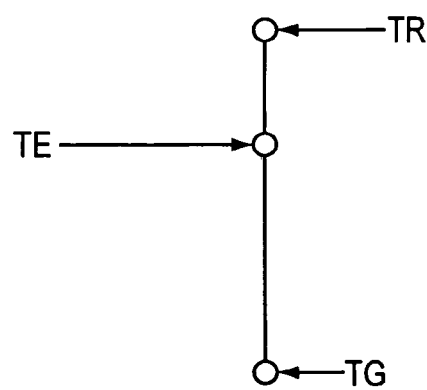
FIG. 5 is a torque diagram at the time of normal traveling in the embodiment of the invention.

Next, an action of the planetary gear unit 13 will be described. FIG. 3 is a view illustrating an action of the planetary gear unit in the embodiment of the invention, FIG. 4 is a vehicle speed diagram at the time of normal traveling in the embodiment of the invention, and FIG. 5 is a torque diagram at the time of normal traveling in the embodiment of the invention.

In the planetary gear unit 13 (FIG. 2), the carrier CR is connected to the engine 11, the sun gear S is connected to the electric generator 16, and the ring gear R is connected to the drive motor 25 and the driving wheels 37, respectively, via the output shaft 14 and the predetermined gear train. As such, the rotating speed of the ring gear R, that is, a ring-gear rotating speed NR is made equal to a rotating speed output to the output shaft 14, that is, an output-shaft rotating speed. The rotating speed of the carrier CR is made equal to the engine rotating speed NE, and the rotating speed of the sun gear S is made equal to the rotating speed of the electric generator 16, that is, a electric-generator rotating speed NG as a first electrically powered machine rotating speed. When the number of teeth of the ring gear R is made $\rho$ times (twice in the embodiment) the number of teeth of the sun gear S, the relationship is established as follows.

$$(\rho+1) \cdot NE = 1 \cdot NG + \rho \cdot NR$$

Accordingly, the engine rotating speed NE can be calculated as follows on the basis of the ring-gear rotating speed NR and the electric-generator rotating speed NG.

$$NE = (1 \cdot NG + \rho \cdot NR)/(\rho+1) \tag{1}$$

In addition, the relation of the rotating speed of the planetary gear unit 13 is constituted by the formula (1).

Also, an engine torque TE, a torque generated in the ring gear R, that is, a ring-gear torque TR, and a torque of the electric generator 16, that is, an electric-generator torque TG as a first electrically powered machine torque are related to one another as follows, and receive reaction forces mutually.

$$TE:TR:TG=(\rho+1):\rho:1 \tag{2}$$

In addition, the relation of a torque of the planetary gear unit 13 is constituted by the formula (2).

At the time of normal traveling of the hybrid type vehicle, all the ring gear R, the carrier CR, and the sun gear S are rotated in the forward direction, and all the ring-gear rotating speed NR, the engine rotating speed NE, and the electric-generator rotating speed NG assume positive values as shown in FIG. 4. Also, since the ring-gear torque TR and the electric-generator torque TG are obtained by proportionally dividing an engine torque TE by a torque ratio that is determined by the number of teeth of the planetary gear unit 13, the ring-gear torque TR and the electric-generator torque TG are added together in the torque diagram shown in FIG. 5 to provide the engine torque TE.

Figure 6:
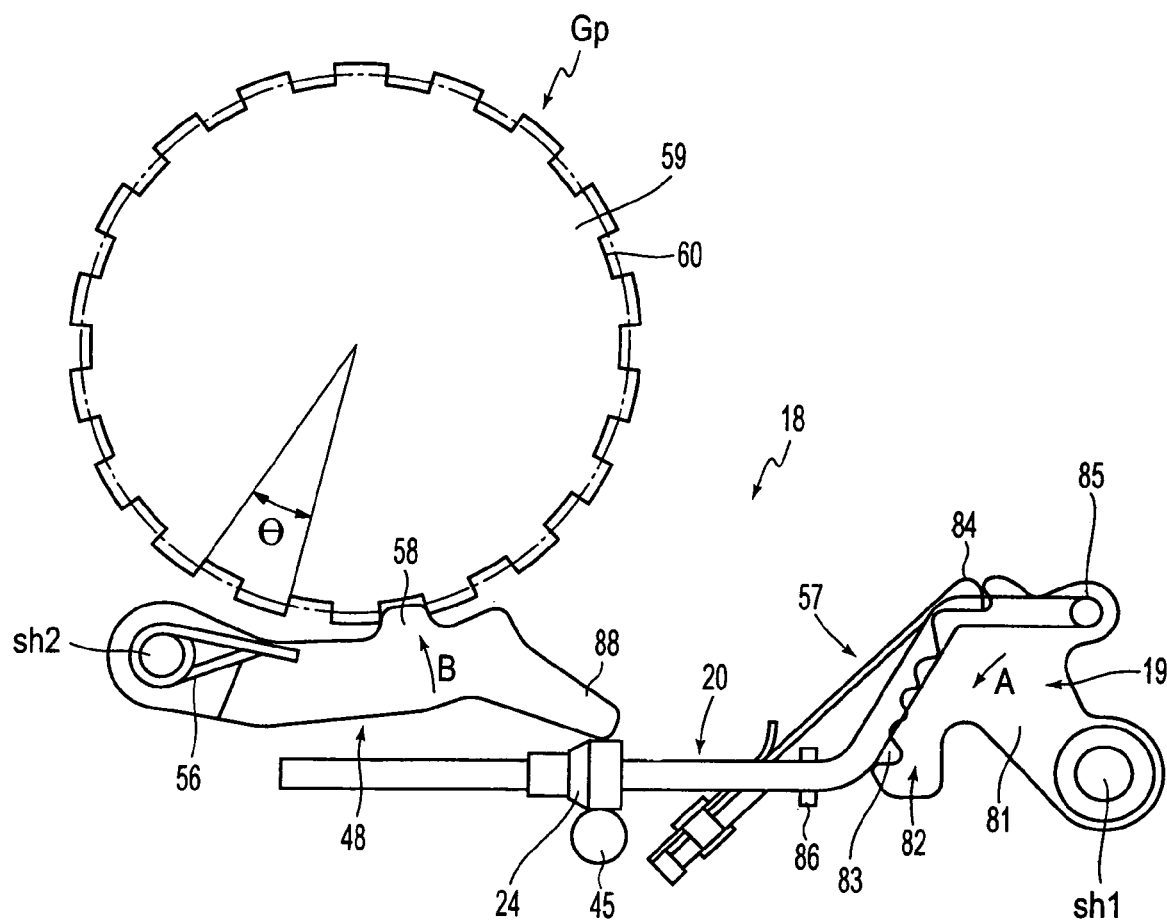
FIG. 6 is a view illustrating a parking lock mechanism in the embodiment of the invention.

Next, an action of the parking lock mechanism 18 will be described. FIG. 6 is a view illustrating an action of the parking lock mechanism in the embodiment of the invention.

In the figure, the parking lock mechanism 18 comprises a plate-shaped detent lever 19 arranged to be able to swing about a swing shaft sh1, a rod 20 that is caused to advance and retreat (move in a left and right direction in the figure) as the detent lever 19 swings, a cam 24 mounted in a predetermined position on the rod 20, a stopper 45 that bears the cam 24, a pawl 48 with a detent arranged to be able to swing about a swing shaft sh2, a torsion spring 56 serving as a first bias member that biases the pawl 48 with a detent toward the rod 20, and a detent spring 57 serving as a second bias member.

The pawl 48 is formed with a detent 58 that is disposed in a predetermined radial location and serves as an engagement to selectively engage with the parking gear Gp, the detent projecting toward an outer peripheral surface of the parking gear Gp. The parking gear Gp is formed on the outer peripheral surface thereof with a plurality of teeth 59 of a predetermined pitch, and valleys 60 formed between the respective teeth 59. In addition, the teeth 59 and the valleys 60 constitute an engaged portion.

The detent lever 19 comprises an arm 81 extending radially outwardly of the swing shaft sh1, and a detent portion 82 extending left and right in a circumferential direction from a tip end of the arm 81, and a plurality of detents (engagement grooves) 83 are formed on an outer peripheral surface of the detent 82 to correspond to positions of the shift lever, that is, shift positions. When the swing shaft sh1 is turned interlocking with a manipulation of the shift lever, the detent lever 19 is caused to swing, and a tip end 84 of the detent spring 57 is caused to engage with the respective detents 83 that correspond to the shift positions.

Also, a hole 85 is formed on one end of the detent portion 82 of the detent lever 19, and a rear end (right end in the figure) of the rod 20 is rotatably mounted to the hole 85, so that the rod 20 is caused to advance and retreat as the detent lever 19 swings, By the way, the cam 24 is arranged in a predetermined location on the rod 20 to be slidable relative to the rod 20, and a projection 86 is arranged in a predetermined location rearwardly (rightward in the figure) of the cam 24. A compression spring serving as a third bias member is arranged between the cam 24 and the projection 86 to be slidable relative to the rod 20 to bias the cam 24 forward (leftward in the figure). A conical surface having an apex toward a front end of the rod 20 is formed in two steps on the cam 24.

When a driver manipulates the shift lever to select the parking range in the parking lock mechanism 18, the swing shaft sh1 is turned and the detent lever 19 is rotated in a direction indicated by an arrow A. In keeping with this, when the detent 83 for parking, among the respective detents 83, and the tip end 84 engage with each other, the rod 20 is caused to advance (move in a leftward direction in the figure). At this time, when the bias of the compression spring causes the cam 24 to advance to enter into a gap between a tip end 88 of the pawl 48 with a detent and the stopper 45.

The pawl 48 with a detent is also rotated against the bias of the torsion spring 56 about the swing shaft sh2 in a direction indicated by an arrow B to be pushed up. As a result, the detent 58 enters into the valley 60, so that the pawl 48 with a detent and the parking gear Gp are caused to engage with each other to lock the parking gear Gp.

In addition, when the pawl 48 is pushed such that the detent 58 and the tooth 59 abut against each other, the pawl 48 with the detent 58 and the parking gear Gp cannot engage with each other and the pawl 48 cannot be pushed up further. In this case, as the detent lever 19 is turned, the cam 24 is caused to retreat (move rightward in the figure) against the bias of the compression spring. Thereafter, when the hybrid type vehicle moves slightly, the parking gear Gp is rotated at least one pitch (one detent 58 and one tooth 59) of the teeth 59. When the detent 58 and the tooth 59 do not abut against each other and the detent 58 is then able to enter into the valley 60, the cam 24 is caused by the bias of the compression spring to advance and the cam 24 pushes up the pawl 48 to cause the pawl 48 and the parking gear Gp to engage with each other.

Next, an explanation will be given of a hybrid type vehicle drive control device as an electrically powered machine drive control device that controls the hybrid type vehicle drive device.

Figure 7:
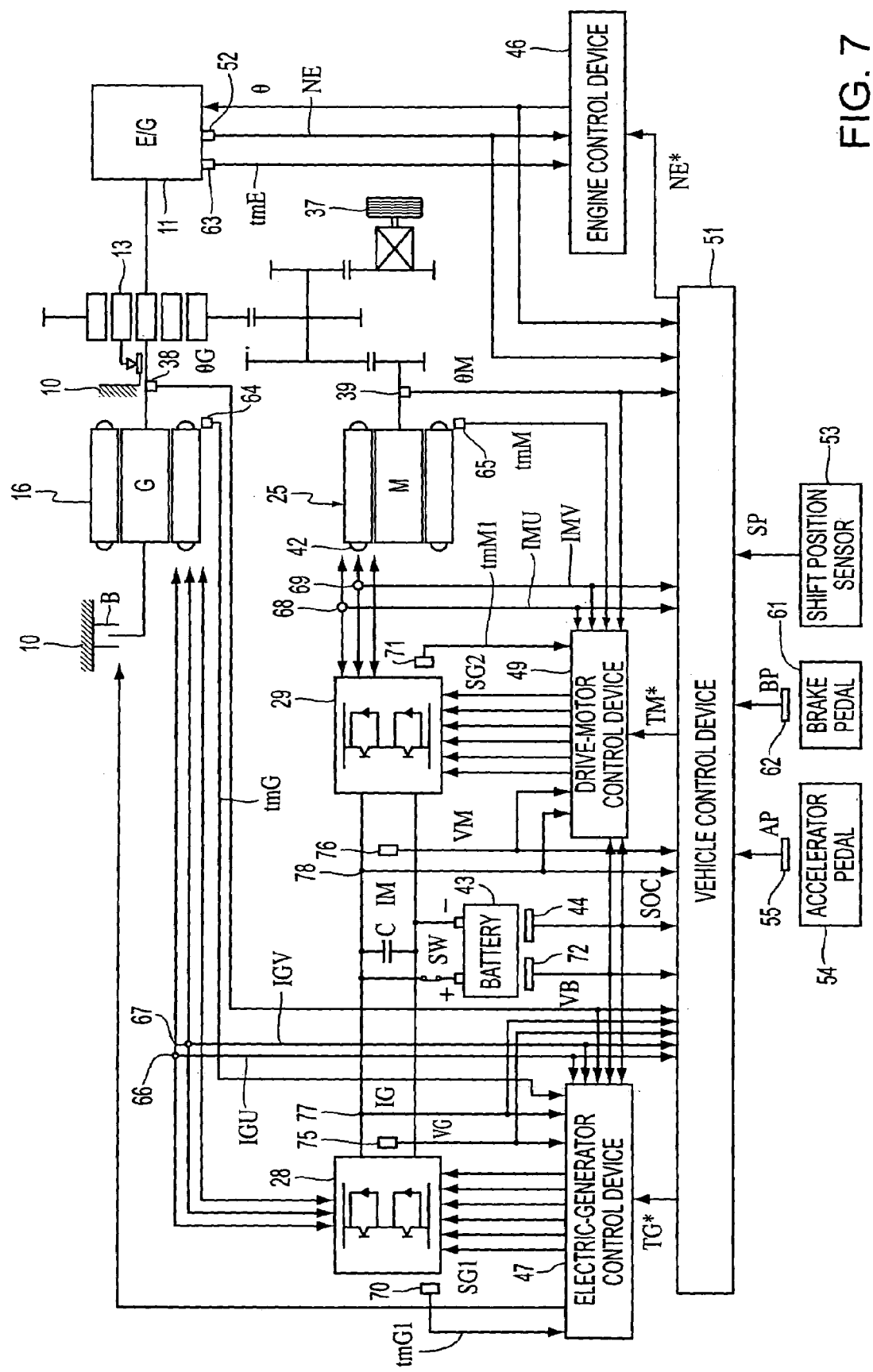
FIG. 7 is a conceptional view showing a hybrid type vehicle drive control device according to the embodiment of the invention.

FIG. 7 is a conceptional view showing a hybrid type vehicle drive control device according to an embodiment of the invention.

In the figure, the reference numeral 10 denotes a casing, 11 an engine (E/G), 13 a planetary gear unit, 16 an electric generator (G), B an electric-generator brake, 25 a drive motor (M), 28 an inverter as an electric-generator inverter that drives the electric generator 16, 29 an inverter as a drive-motor inverter that drives the drive motor 25, 37 driving wheels, 38, 39 rotor position sensors, and 43 a battery. The inverters 28, 29 are connected to the battery 43 via an electric-source switch SW, and the battery 43 supplies direct current to the inverters 28, 29 when the electric-source switch SW is ON. Both the respective inverters 28, 29 comprise, for example, six transistors as switching elements, and the respective transistors are united pair by pair to constitute transistor modules (IGBT) of respective phases.

Arranged on an inlet side of the inverter 28 are an electric-generator inverter voltage sensor 75 as a first DC voltage detection unit that detects a DC voltage applied to the inverter 28, that is, an electric-generator inverter voltage VG. An electric-generator inverter current sensor 77 as a first DC detection unit detects direct current supplied to the inverter 28, that is, an electric-generator inverter current IG. Also, arranged on an inlet side of the inverter 29 are a drive-motor inverter voltage sensor 76 as a second DC voltage detection unit that detects a DC voltage applied to the inverter 29, that is, a drive-motor inverter voltage VM. A drive-motor inverter current sensor 78 as a second DC detection unit detects direct current supplied to the inverter 29, that is, a drive-motor inverter current IM. The electric-generator inverter voltage VG and the electric-generator inverter current IG are fed to a vehicle control device 51 and an electric-generator control device 47. The drive-motor inverter voltage VM and the drive-motor inverter current IM are fed to the vehicle control device 51 and a drive-motor control device 49. In addition, a smoothing capacitor C is connected between the battery 43 and the inverters 28, 29.

Also, the vehicle control device 51 comprises a CPU, recording devices which are not shown, and controls the entire hybrid type vehicle drive control device to function as a computer in accordance with a predetermined program, data, etc. Connected to the vehicle control device 51 are an engine control device 46, the electric-generator control device 47, and the drive-motor control device 49. The engine control device 46 comprises a CPU, recording devices, etc. which are not shown, and forwards a throttle opening degree θ, and a command signal such as valve timing to the engine 11 and the vehicle control device 51 in order to control the engine 11. Also, the electric-generator control device 47 comprises a CPU, recording devices which are not shown, and forwards a drive signal SG1 to the inverter 28 in order to control the electric generator 16. The drive-motor control device 49 comprises a CPU, recording devices which are not shown, and forwards a drive signal SG2 to the inverter 29 in order to control the drive motor 25. In addition, the engine control device 46, the electric-generator control device 47, and the drive-motor control device 49 constitute a first control device below the vehicle control device 51 in order. The vehicle control device 51 constitutes a second control device above the engine control device 46, the electric-generator control device 47, and the drive-motor control device 49 in order. Also, the engine control device 46, the electric-generator control device 47, and the drive-motor control device 49 also function as computers in accordance with a predetermined program.

The inverter 28 is driven according to a drive signal SG1, receives direct current from the battery 43 at the time of power running to generate currents IGU, IGV, IGW of respective phases to supply the currents IGU, IGV, IGW of respective phases to the electric generator 16, and receives currents IGU, IGV, IGW of respective phases from the electric generator 16 at the time of regeneration to generate direct current to supply the same to the battery 43.

The inverter 29 is driven according to a drive signal SG2, receives direct current from the battery 43 at the time of power running to generate currents IMU, IMV, IMW of respective phases to supply the currents IMU, IMV, IMW of respective phases to the drive motor 25, and receives currents IMU, IMV, IMW of respective phases from the drive motor 25 at the time of regeneration to generate direct current to supply the same to the battery 43.

The reference numeral 44 denotes a battery residual quantity detection device that detects a state of the battery 43, that is, a battery residual quantity SOC as a battery state. Reference number 52 detects an engine rotating speed sensor that detects an engine rotating speed NE, 53 a shift position sensor that detects a shift position SP, 55 an accelerator switch as an accelerator manipulation detection unit that detects a position (trodden amount) of an accelerator pedal 54, that is, an accelerator pedal position AP, 61 a brake pedal, 62 a brake switch as a brake manipulation detection unit to detect a position (trodden amount) of the brake pedal 61, that is, a brake pedal position BP, 63 an engine temperature sensor that detects a temperature tmE of the engine 11, 64 an electric-generator temperature sensor that detects a temperature of the electric generator 16, for example, a temperature tmG of the coil 23 (FIG. 2), 65 a drive-motor temperature sensor that detects a temperature of the drive motor 25, for example, a temperature tmM of the coil 42, 70 a first inverter temperature sensor that detects a temperature tmGI of the inverter 28, and 71 a second inverter temperature sensor that detects a temperature tmMI of the inverter 29. In addition, the temperatures tmG, tmGI are forwarded to the electric-generator control device 47, and the temperatures tmM, tmMI are forwarded to the drive-motor control device 49.

Further, the reference numerals 66 to 69, respectively, denote current sensors as alternating current detection units that detect currents IGU, IGV, IMU, IMV of respective phases, and 72 a battery voltage sensor as a voltage detection unit for the battery 43 to detect a battery voltage VB as the battery state. The battery voltage VB and the battery residual quantity SOC are forwarded to the electric-generator control device 47, the drive-motor control device 49, and the vehicle control device 51. Also, battery current, battery temperature, or the like can also be detected as the battery state. In addition, a battery state detection unit comprises the battery residual quantity detection device 44, the battery voltage sensor 72, a battery current sensor (not shown), a battery temperature sensor (not shown). Also, the currents IGU, IGV are supplied to the electric-generator control device 47 and the vehicle control device 51, and the currents IMU, IMV are supplied to the drive-motor control device 49 and the vehicle control device 51.

The vehicle control device 51 forwards an engine control signal to the engine control device 46 to cause the engine control device 46 to set starting/stoppage of the engine 11. Also, vehicle speed calculation processing means (not shown) in the vehicle control device 51 performs a vehicle speed calculation processing to calculate a rate of change $\Delta\theta M$ of a rotor position $\theta M$ and to calculate a vehicle speed V on the basis of the rate of change $\Delta\theta M$ and a gear ratio $\gamma V$ in a torque transmission system extending from the output shaft 26 to the driving wheels 37.

The vehicle control device 51 sets a target engine rotating speed NE* representative of a target value of an engine rotating speed NE, a target electric-generator torque TG* as a first target electrically powered machine torque representative of a target value of an electric-generator torque TG, and a target drive-motor torque TM* as a second target electrically powered machine torque representative of a target value of a drive-motor torque TM. The electric-generator control device 47 sets a target electric-generator rotating speed NG* as a first target electrically powered machine rotating speed representative of a target value of an electric-generator rotating speed NG. The drive-motor control device 49 sets a drive-motor torque correction value $\delta TM$ representative of a correction value of a drive-motor torque TM. In addition, a control command value is constituted by the target engine rotating speed NE*, the target electric-generator torque TG* and the drive-motor torque correction value TM*.

Also, electric-generator rotating speed calculation processing means (not shown) in the electric-generator control device 47 performs an electric-generator rotating speed calculation processing to read the rotor position $\theta G$ to calculate a rate of change $\Delta\theta G$ of the rotor position $\theta G$, thereby calculating the electric-generator rotating speed NG.

Drive-motor rotating speed calculation processing means (not shown) in the drive-motor control device 49 performs a drive-motor rotating speed calculation processing to read the rotor position $\theta M$ to calculate a rate of change $\Delta\theta M$ of the rotor position $\theta M$, thereby calculating a drive-motor rotating speed NM as a second electrically powered machine rotating speed.

In addition, since the rotor position $\theta G$ and the electric-generator rotating speed NG are in proportion to each other and the rotor position $\theta M$, the drive-motor rotating speed NM, and the vehicle speed V are in proportion to one another. It is thus possible to have the rotor position sensor 38 and the electric-generator rotating speed calculation processing means function as an electric-generator rotating speed detection unit that detects the electric-generator rotating speed NG, to have the rotor position sensor 39 and the drive-motor rotating speed calculation processing means function as a drive-motor rotating speed detection unit that detects the drive-motor rotating speed NM, and to have the rotor position sensor 39 and the vehicle speed calculation processing means function as a vehicle speed detection unit that detects the vehicle speed V.

While the engine rotating speed sensor 52 detects an engine rotating speed NE in the embodiment, an engine rotating speed NE can be calculated in the engine control device 46. Also, while a vehicle speed V is calculated by the vehicle speed calculation processing means on the basis of the rotor position $\theta M$ in the embodiment, it is possible to detect a ring-gear rotating speed NR to calculate a vehicle speed V on the basis of the ring-gear rotating speed NR, and to calculate a vehicle speed V on the basis of a rotating speed of the driving wheels 37, that is, a driving wheel rotating speed. In this case, a ring-gear rotating speed sensor and a driving wheel rotating speed sensor, are arranged as a vehicle-speed detection unit.

Next, an explanation will be given to an operation of the hybrid type vehicle drive control device constructed in the above manner.

Figure 8:
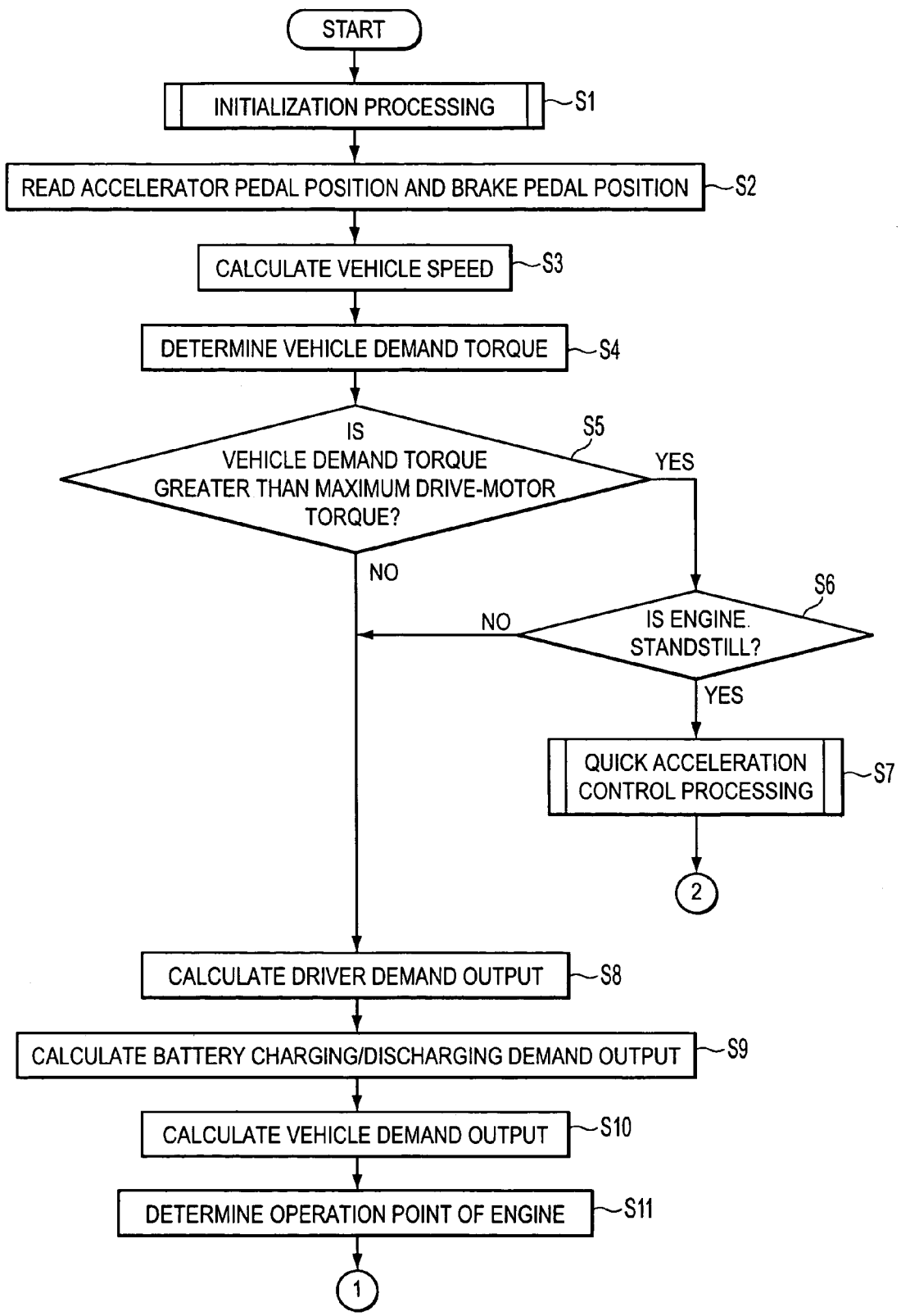
FIG. 8 is a first main flowchart illustrating an operation of the hybrid type vehicle drive control device according to the embodiment of the invention.
Figure 9:
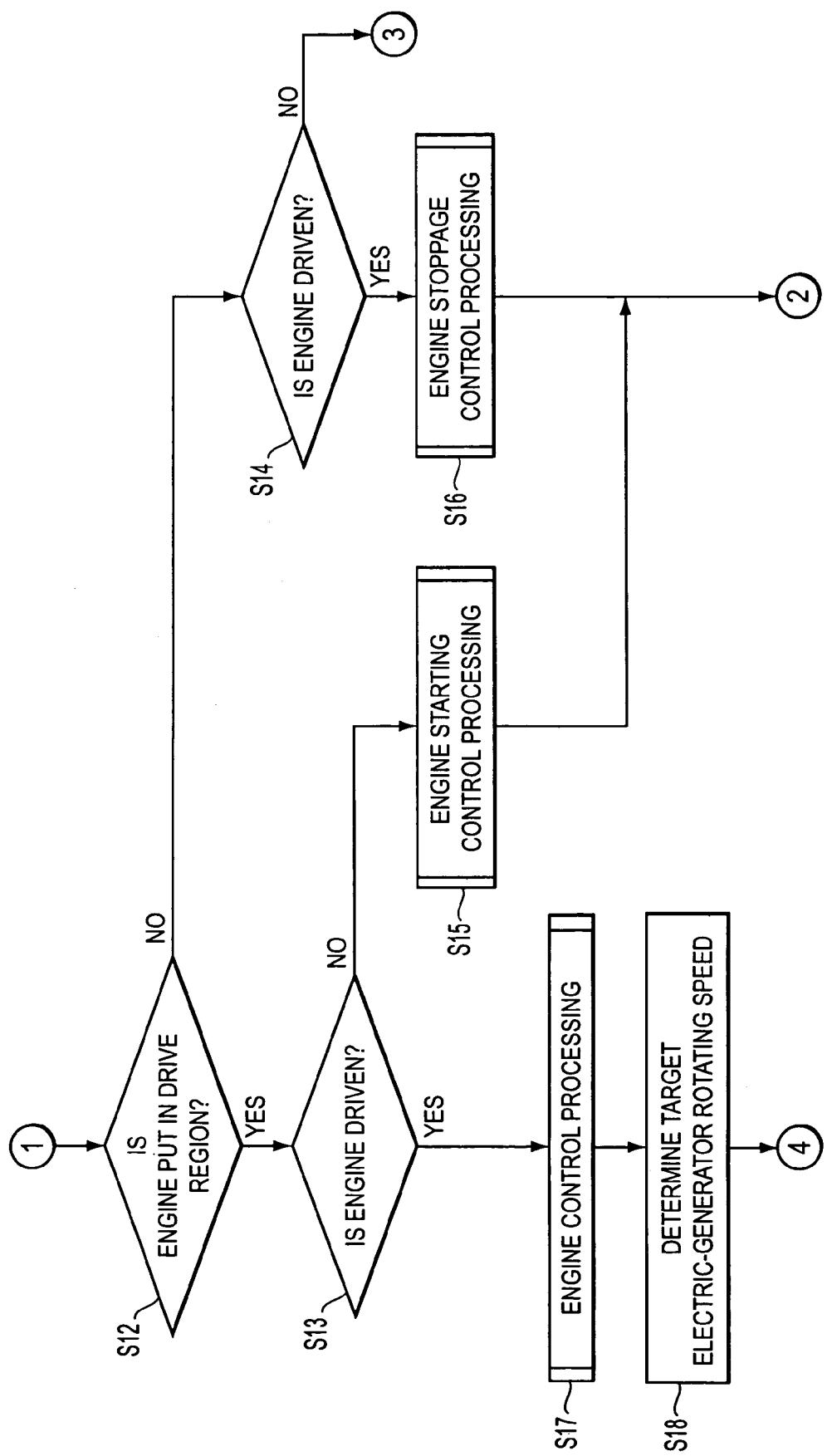
FIG. 9 is a second main flowchart illustrating an operation of the hybrid type vehicle drive control device according to the embodiment of the invention.
Figure 10:
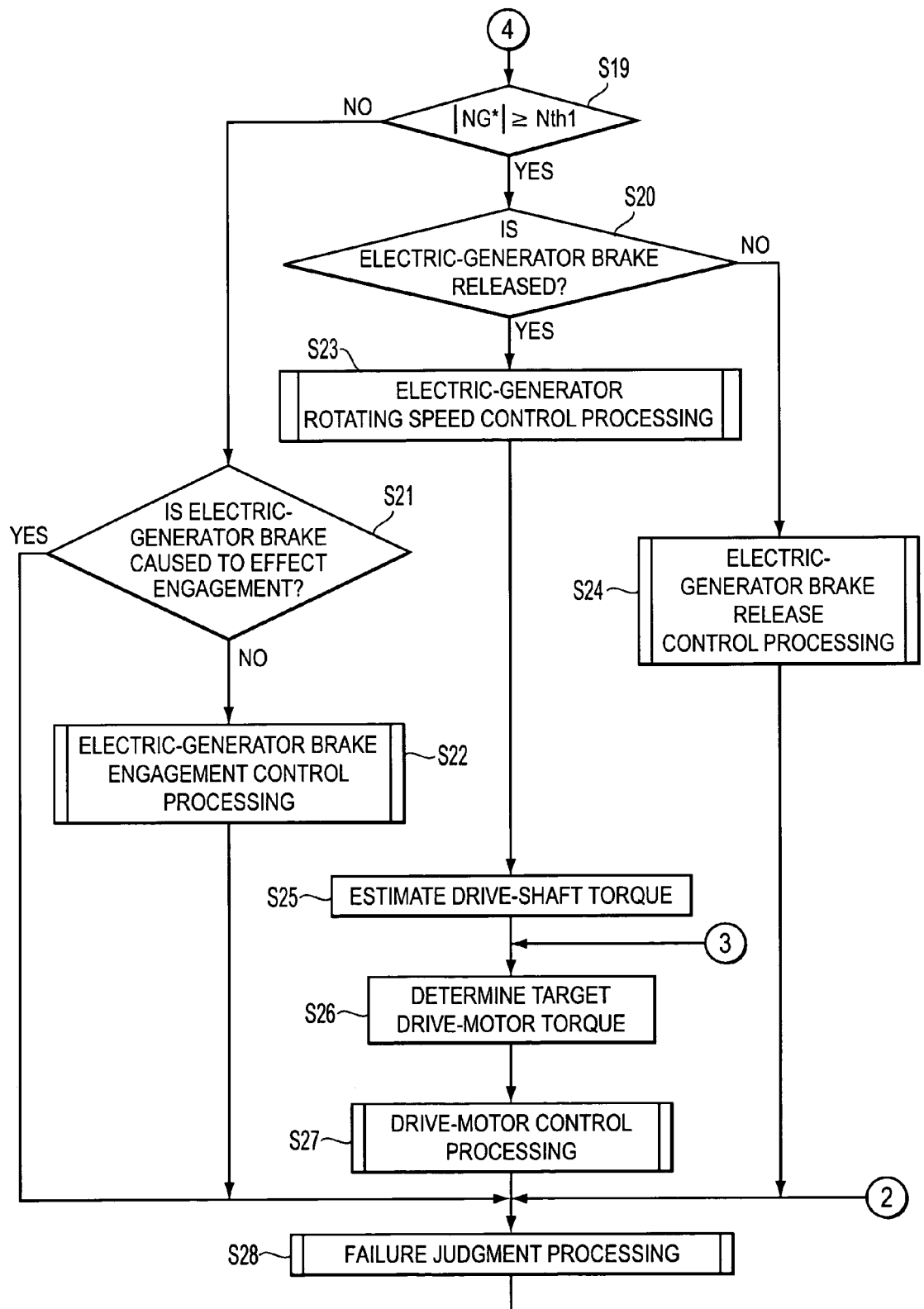
FIG. 10 is a third main flowchart illustrating an operation of the hybrid type vehicle drive control device according to the embodiment of the invention.
Figure 11:
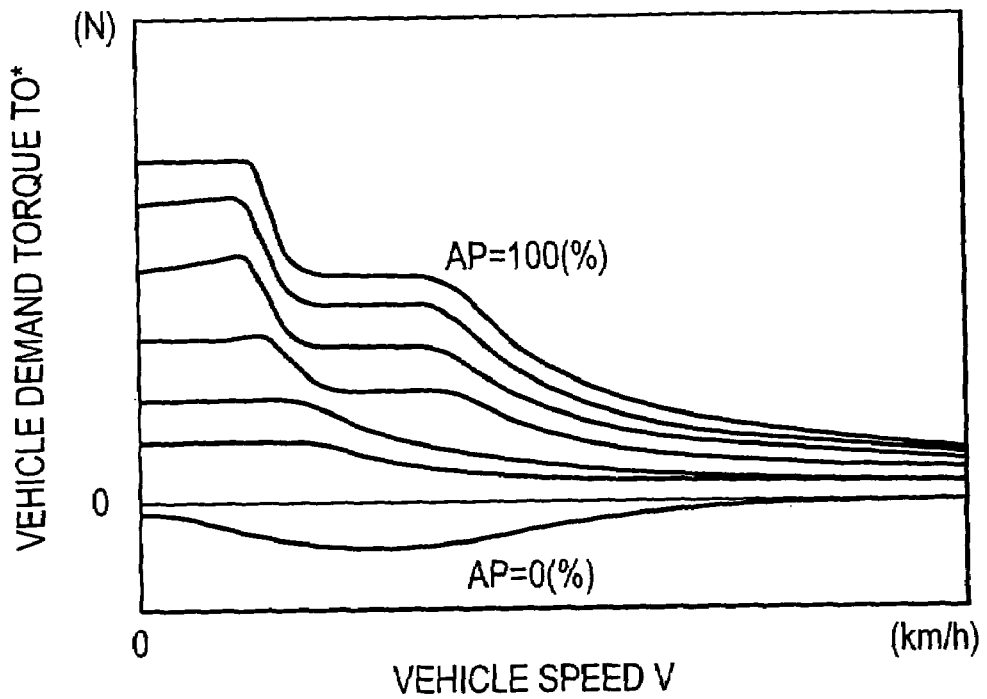
FIG. 11 is a first vehicle demand torque map in the embodiment of the invention.
Figure 12:
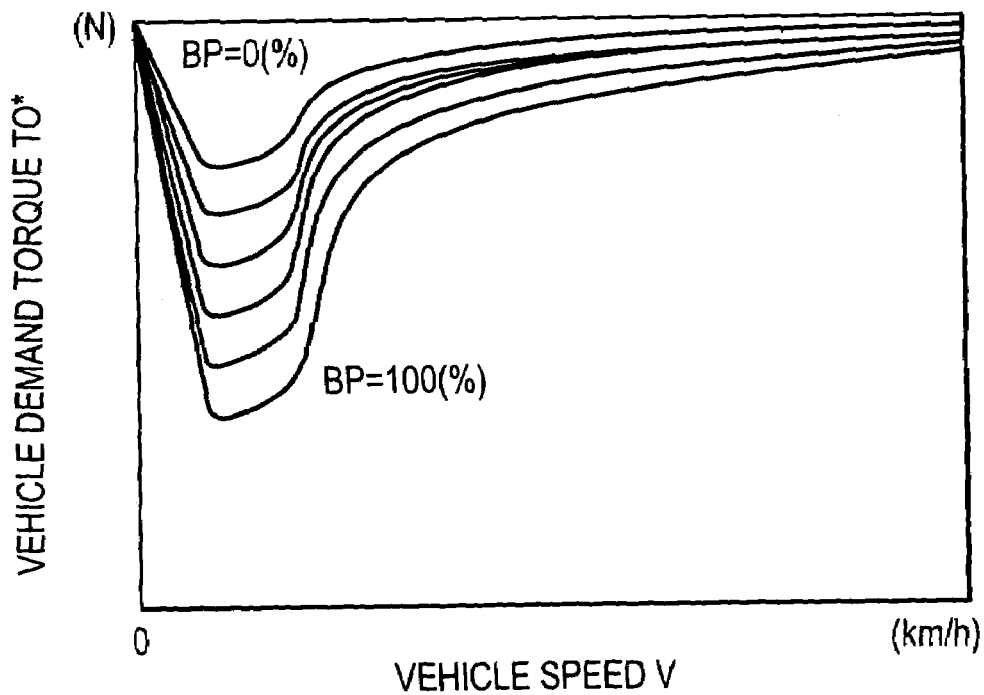
FIG. 12 is a second vehicle demand torque map in the embodiment of the invention.
Figure 13:
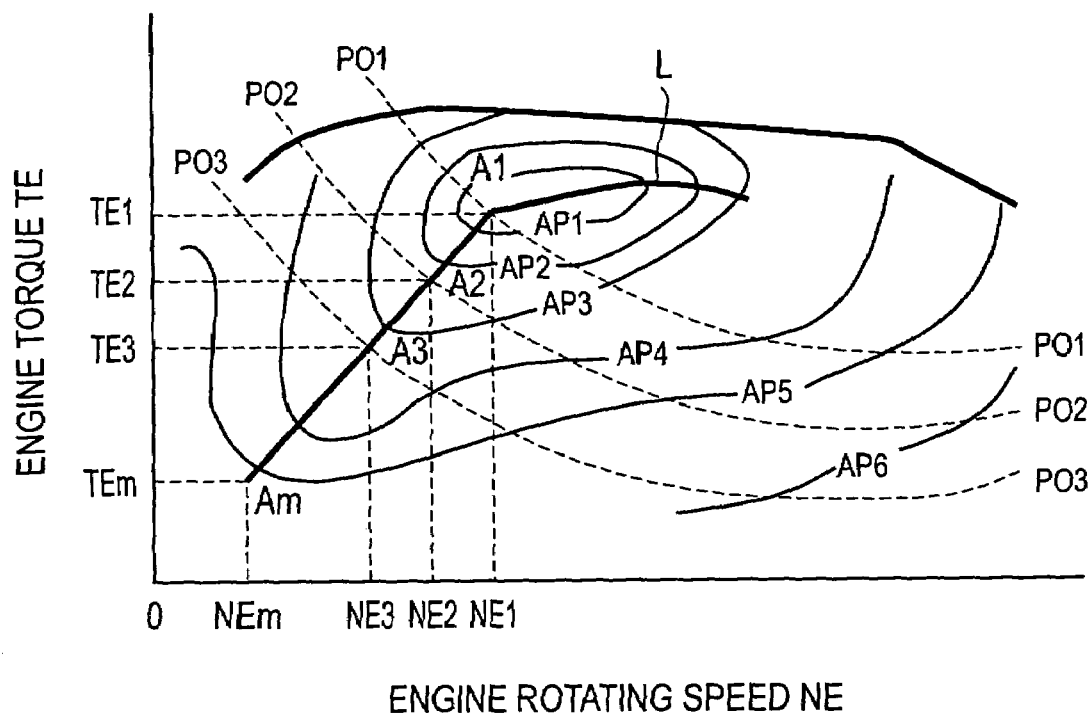
FIG. 13 is a target engine operating state map in the embodiment of the invention.
Figure 14:
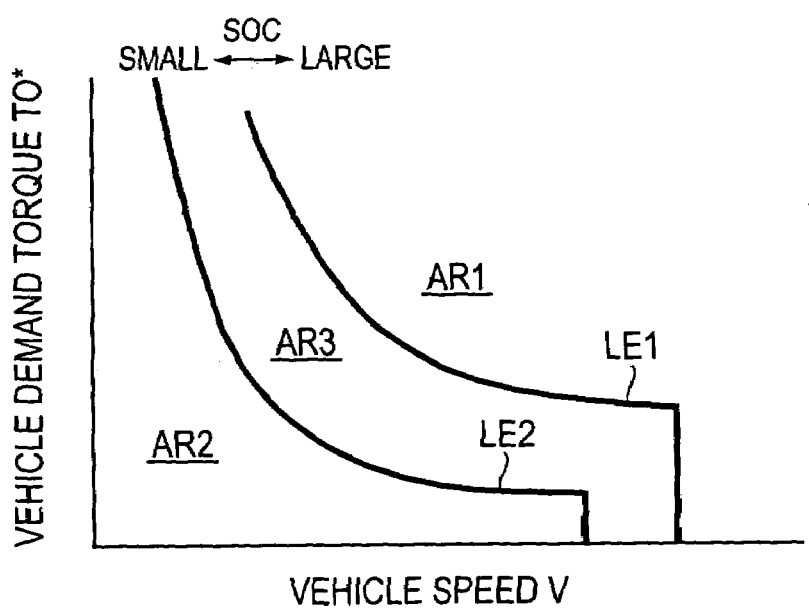
FIG. 14 is an engine drive region map in the embodiment of the invention.

FIG. 8 is a first main flowchart illustrating an operation of the hybrid type vehicle drive control device according to the embodiment of the invention, FIG. 9 is a second main flowchart illustrating an operation of the hybrid type vehicle drive control device according to the embodiment of the invention, FIG. 10 is a third main flowchart illustrating an operation of the hybrid type vehicle drive control device according to the embodiment of the invention, FIG. 11 is a first vehicle demand torque map in the embodiment of the invention, FIG. 12 is a second vehicle demand torque map in the embodiment of the invention, FIG. 13 is a target engine operating state map in the embodiment of the invention, and FIG. 14 is an engine drive region map in the embodiment of the invention. In addition, in FIGS. 11, 12, and 14, an axis of abscissa indicates a vehicle speed V and an axis of ordinate indicates a vehicle demand torque TO* while in FIG. 13, an axis of abscissa indicates an engine rotating speed NE and an axis of ordinate indicates an engine torque TE.

Reference will first be made with regard to the flowcharts of FIGS. 8–10. First, in Step S1, initialization processing means (not shown) in the vehicle control device 51 (FIG. 7) performs an initialization processing to have various variables assume initial values. Next, in Step S2, the vehicle control device 51 reads an accelerator pedal position AP from the accelerator switch 55 and reads a brake pedal position BP from the brake switch 62. In Step S3, the vehicle speed calculation processing means reads a rotor position θM to calculate a rate of change ΔθM of the rotor position θM, thus calculating a vehicle speed V on the basis of the rate of change ΔθM and the gear ratio γV.

Subsequently, in Step S4, vehicle demand torque determining processing means (not shown) in the vehicle control device 51 performs a vehicle demand torque determining processing to determine a vehicle demand torque TO*, which is beforehand set corresponding to an accelerator pedal position AP, a brake pedal position BP, and a vehicle speed V. The vehicle demand torque 70 is torque required for causing a hybrid type vehicle to travel. The vehicle demand torque 70 is determined by referring to the first vehicle demand torque map of FIG. 11 recorded in a recording device of the vehicle control device 51 when the accelerator pedal 54 is trodden, and by referring to the second vehicle demand torque map of FIG. 12 recorded in the recording device when the brake pedal 61 is trodden.

Next, in Step S5, the vehicle control device 51 judges whether the vehicle demand torque TO* is greater than a maximum drive-motor torque TMmax as a second electrically powered machine maximum torque representative of a maximum value of a drive-motor torque TM. When the vehicle demand torque TO* is greater than a maximum drive-motor torque Tmmax (S5: Yes), the processing proceeds to Step S6 where the vehicle control device 51 judges whether the engine 11 is standstill (i.e., if the engine 11 is stopped). When the engine 11 is standstill, the processing proceeds to Step S7 where quick acceleration control processing means (not shown) in the vehicle control device 51 performs a quick acceleration control processing to drive the drive motor 25 and the electric generator 16 to cause a hybrid type vehicle to travel.

Also, when the vehicle demand torque TO* is not greater than a maximum drive-motor torque Tmmax (S5: No), and when the vehicle demand torque TO* is greater than a maximum drive-motor torque TMmax (S5: Yes) and the engine 11 is not standstill (S6: No), driver demand output calculation processing means (not shown) in the vehicle control device 51 performs in Step S8 a driver demand output calculation processing to calculate a driver demand output PD by multiplying the vehicle demand torque TO* and a vehicle speed V.

$$PD = TO^* \cdot V$$

In addition, when making a comparison between the vehicle demand torque TO* and a maximum drive-motor torque TMmax, the maximum drive-motor torque TMmax is actually multiplied by a gear ratio γMA in an extent from the output shaft 26 to a drive shaft of the driving wheels 37 and a comparison is made between the vehicle demand torque TO* and a multiplied value. In addition, first and second vehicle demand torque maps can be created estimating the gear ratio γMA beforehand.

Next, in Step S9, battery charging/discharging demand output calculation processing means (not shown) in the vehicle control device 51 performs a battery charging/discharging demand output calculation processing to read a battery residual quantity SOC from the battery residual quantity detection device 44 and to calculate a battery charging/discharging demand output PB on the basis of the battery residual quantity SOC.

Subsequently, in Step S10, vehicle demand output calculation processing means (not shown) in the vehicle control device 51 performs a vehicle demand output calculation processing means to effect an addition of the driver demand output PD and the battery charging/discharging demand output PB, thereby calculating a vehicle demand output PO.

$$PO = PD + PB$$

Next, in Step S11, target engine operating state setting processing means (not shown) in the vehicle control device 51 performs a target engine operating state setting processing by reference to the target engine operating state map of FIG. 13 recorded in the recording device of the vehicle control device 51. The target engine operating state map includes points A1 to A3, Am, at which lines PO1, PO2, ... representative of the vehicle demand output PO intersect an optimum fuel consumption curve L, along which the engine 11 in respective accelerator pedal positions AP1 to AP6 becomes highest in efficiency as operating points of the engine 11 being a target engine operating state. The target engine operating state map is used to determine engine torques TE1 to TE3, TEm in the operating points as a target engine torque TE* representative of a target value of an engine torque TE, and to determine engine rotating speeds NE1 to NE3, NEm in the operating points as a target engine rotating speed NE* to forward the target engine rotating speed NE* to the engine control device 46.

In Step S11, the engine control device 46 refers to the engine drive region map of FIG. 14 recorded in a recording device of the engine control device 46 to judge whether the engine 11 is put in a drive region AR1. In FIG. 14, AR1 indicates a drive region, in which the engine 11 is driven, AR2 indicates a stoppage region, in which driving of the engine 11 is stopped, and AR3 indicates a hysteresis region. Also, LE1 indicates a line, along which the engine 11 having been stopped is driven, and LE2 indicates a line, along which driving of the engine 11 having been driven is stopped. In addition, as the battery residual quantity SOC is increased, the line LE1 is shifted rightward in FIG. 14 and the drive region AR1 is narrowed, and as the battery residual quantity SOC is decreased, the line is shifted leftward in FIG. 14 and the drive region AR1 is enlarged.

When the engine 11 is not driven (S13: No) although the engine 11 is put in the drive region AR1 (S12; Yes), engine starting control processing means (not shown) in the engine control device 46 performs engine starting control processing in Step S15 to start the engine 11. Also, when the engine 11 is driven (S14: Yes) although the engine 11 is not put in the drive region AR1 (S12: No), engine stoppage control processing means (not shown) in the engine control device 46 performs an engine stoppage control processing in Step S16 to stop driving the engine 11. When the engine 11 is not put in the drive region AR1 (S12: No) and the engine 11 is not driven (S14: No), target drive-motor torque calculation processing means (not shown) in the vehicle control device 51 performs a target drive-motor torque calculation processing in Step S26 to calculate and determine the vehicle demand torque TO* as a target drive-motor torque TM* to forward the target drive-motor torque TM* to the drive-motor control device 49. In Step S27, drive-motor control processing means (not shown) in the drive-motor control device 49 performs a drive-motor control processing to control torque of the drive motor 25.

Also, when the engine 11 is put in the drive region AR1 (S12: Yes) and the engine 11 is driven (S13: Yes), engine control processing means (not shown) in the engine control device 46 performs in Step S17 an engine control processing to control the engine 11 in a predetermined way.

Next, in Step S18, target electric-generator rotating speed calculation processing means (not shown) in the electric-generator control device 47 performs a target electric-generator rotating speed calculation processing. The target electric-generator rotating speed calculation processing means also concretely reads a rotor position θM from the vehicle control device 51 to calculate a ring-gear rotating speed NR on the basis of the rotor position θM and a gear ratio γR in an extent from the output shaft 26 (FIG. 2) to the ring gear R. Target electric-generator rotating speed calculation processing means also reads a target engine rotating speed NE* determined in the target engine operating state setting processing to calculate and determine a target electric-generator rotating speed NG* by means of the formula of rotating speed on the basis of the ring-gear rotating speed NR and the target engine rotating speed NE*.

By the way, when an electric-generator rotating speed NG is low when the drive motor 25 and the engine 11 causes the hybrid type vehicle constructed in the above manner to travel, power consumption is increased and the electric generator 16 is reduced in generating efficiency. The hybrid type vehicle is thus correspondingly worsened in fuel consumption. Hereupon, when the absolute value of a target electric-generator rotating speed NG* is less than a predetermined rotating speed, the electric-generator brake B is caused to effect engagement, and the electric generator 16 is mechanically stopped, whereby the fuel consumption is improved.

Therefore, in Step S19, the electric-generator control device 47 judges whether the absolute value of the target electric-generator rotating speed NG* is not less than a first predetermined rotating speed Nth1 (for example, 500 [rpm]). When the absolute value of the target electric-generator rotating speed NG* is not less than the first rotating speed Nth1 (S19: Yes), the electric-generator control device 47 judges in Step S20 whether the electric-generator brake B is released. When the electric-generator brake B is released (S20: Yes), electric-generator rotating speed control processing means (not shown) in the electric-generator control device 47 performs in Step S23 an electric-generator rotating speed control processing to control torque of the electric generator 16. Also, when the electric-generator brake B is not released (S20: No), electric-generator brake release control processing means (not shown) in the electric-generator control device 47 performs in Step S24 an electric-generator brake release control processing to release the electric-generator brake B.

By the way, when a target electric-generator torque TG* is determined and torque of the electric generator 16 is controlled on the basis of the target electric-generator torque TG* and a predetermined electric-generator torque TG is generated in the electric-generator rotating speed control processing, an engine torque TE, a ring-gear torque TR, and an electric-generator torque TG receive reaction forces mutually as described above. An electric-generator torque TG is thus converted into a ring-gear torque TR to be output from the ring gear R.

When an electric-generator rotating speed NG is varied and the ring-gear torque TR is varied as the ring-gear torque TR is output from the ring gear R, the varied ring-gear torque TR is transmitted to the driving wheels 37 and the hybrid type vehicle is degraded in traveling feeling. Hereupon, a ring-gear torque TR is calculated estimating a torque corresponding to inertia (inertia of the rotor 21 and the rotor shaft) of the electric generator 16 that accompanies variation of an electric-generator rotating speed NG.

Therefore, ring-gear torque calculation processing means (not shown) in the vehicle control device 51 performs a ring-gear torque calculation processing means to read the target electric-generator torque TG* to calculate a ring-gear torque TR on the basis of the target electric-generator torque TG* and a ratio of the number of teeth of the ring gear R to the number of teeth of the sun gear S.

That is, a torque applied on the sun gear S, that is, a sun-gear torque TS is obtained by subtracting from the target electric-generator torque TG* a torque equivalent component (inertial torque) TGI corresponding to an inertia InG $$TGI = InG \cdot \alpha G$$

where InG indicates an inertia of the electric generator 16 and αG indicates an angular acceleration (rate of change of rotation), and the following formula is resulted.

$$TS = TG^* - TGI = TG^* - InG \cdot \alpha G \tag{3}$$

In addition, when an engine rotating speed NE is constant, the torque equivalent component TGI assumes a negative value in a direction of acceleration when the hybrid type vehicle is accelerated, and a positive value in the direction of acceleration when the hybrid type vehicle is decelerated. Also, an angular acceleration αG is calculated by differentiating an electric-generator rotating speed NG.

When the number of teeth of the ring gear R is ρ times the number of teeth of the sun gear S, a ring-gear torque TR is ρ times a sun-gear torque TS to provide $$TR = \rho \cdot TS = \rho \cdot (TG^* - TGI) = \rho \cdot (TG^* - InG \cdot \alpha G) \tag{4}$$

In this manner, it is possible to calculate a ring-gear torque TR from a target electric-generator torque TG* and a torque equivalent component TGI.

Hereupon, in Step S25, drive-shaft torque estimation processing means (not shown) in the drive-motor control device 49 performs a drive-shaft torque estimation processing to estimate a torque on the output shaft 26, that is, a drive-shaft torque TR/OUT on the basis of the target electric-generator torque TG* and the torque equivalent component TGI. That is, the drive-shaft torque estimation processing means estimates and calculates a drive-shaft torque TR/OUT on the basis of the ring-gear torque TR and a ratio of the number of teeth of the second counter drive gear 27 to the number of teeth of the ring gear R.

In addition, since a target electric-generator torque TG* is made zero when the electric-generator brake B is caused to effect engagement, a ring-gear torque TR is put in proportion to an engine torque TE. Hereupon, when the electric-generator brake B is caused to effect engagement, the drive-shaft torque estimation processing means reads an engine torque TE through the vehicle control device 51 to calculate a ring-gear torque TR by means of the torque formula on the basis of the engine torque TE to estimate the drive-shaft torque TR/OUT on the basis of the ring-gear torque TR and a ratio of the number of teeth of the second counter drive gear 27 to the number of teeth of the ring gear R.

Subsequently, in Step S26, the target drive-motor torque calculation processing means performs a target drive-motor torque calculation processing to calculate and determine an amount short of or over the drive-shaft torque TR/OUT as a target drive-motor torque TM* by subtracting the drive-shaft torque TR/OUT from the vehicle demand torque TO*.

In Step S27, the drive-motor control processing means performs a drive-motor control processing to control a torque of the drive motor 25 on the basis of the determined target drive-motor torque TM*, thus controlling a drive-motor torque TM.

Also, when the absolute value of a target electric-generator rotating speed NG* is less than the first rotating speed Nth1 (S19: No), the electric-generator control device 47 judges in Step S21 whether the electric-generator brake B is caused to effect engagement. When the electric-generator brake B is not caused to effect engagement (S21: No), electric-generator brake engagement control processing means (not shown) in the electric-generator control device 47 performs in Step 22 an electric-generator brake engagement control processing to cause the electric-generator brake B to effect engagement.

By the way, the parking gear Gp is formed integral with the ring gear R, so that when a driver manipulates the shift lever to select the parking range, the parking lock mechanism 18 is actuated and the pawl 48 with a detent, arranged swingably, is caused to engage with the parking gear Gp to lock the parking gear Gp, thus locking the driving wheels 37.

When failure occurs in the parking lock mechanism 18, however, the driving wheels 37 cannot be locked. Hereupon, in Step S28, the fail judgment processing means 91 (FIG. 1) in the vehicle control device 51 performs an fail judgment processing to read the rotor position θM as an index of rotation to judge whether a failure has occurred in the parking lock mechanism 18, on the basis of a change in the rotor position θM. The processing thereafter ends.

Figure 15:
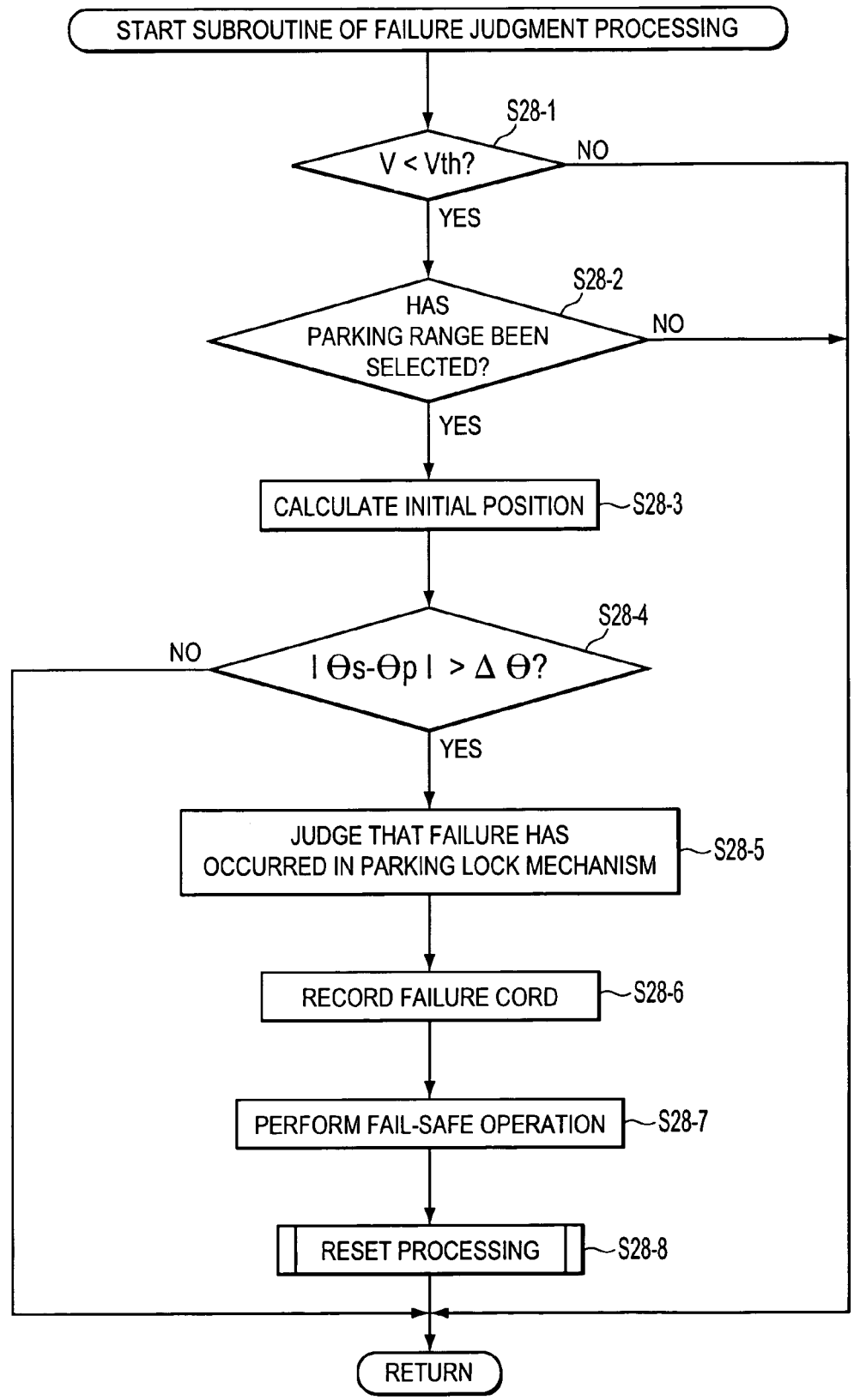
FIG. 15 is a view showing a subroutine of fail judgment processing in the embodiment of the invention.

Next, an explanation will be given to a subroutine of the fail judgment processing in Step S28 shown in FIG. 10. FIG. 15 is a view showing a subroutine of the fail judgment processing according to the embodiment of the invention.

In this case, the fail judgment processing means 91 (FIG. 1) judges whether a failure has occurred in the parking lock mechanism 18 (FIG. 6) when the shift lever is manipulated to select the parking range. As such, the hybrid type vehicle is placed in a state in which the hybrid vehicle is substantially standstill, that is, in a standstill state.

Therefore, vehicle stoppage judgment processing means (not shown) in the fail judgment processing means 91 performs in Step S28-1 a vehicle stoppage judgment processing to read a vehicle speed V and to judge whether the hybrid type vehicle is put in a stopped state. This judgment is based on the vehicle speed V, that is, depending upon whether the vehicle speed V is lower than a threshold Vth.

As described, when the pawl 48 with a detent 58 is pushed in order to cause the detent 58 and the tooth 59 to abut against each other, the pawl 48 with a detent and the parking gear Gp cannot be engaged with each other. Thereafter, the hybrid type vehicle moves slightly due to vehicle weight or the like, whereby the parking gear Gp is rotated at least one pitch of the teeth 59, and then the detent 58 and the tooth 59 do not abut against each other. As a result, the detent 58 becomes able to enter into the valley 60, and the cam 24 pushes up the pawl 48 with a detent to cause the pawl 48 with the detent 58 and the parking gear Gp to engage with each other.

Hereupon, the threshold Vth is set to a value corresponding to a rotating speed of the parking gear Gp when the hybrid type vehicle moves slightly due to vehicle weight or the like. Accordingly, judgment to the effect that fail has occurred in the parking lock mechanism 18 is prevented from being erroneously passed.

In addition, it is judged according to the embodiment whether the hybrid type vehicle is put in a stopped state, on the basis of whether the vehicle speed V is lower than the threshold Vthin. It is also possible to judge whether the hybrid type vehicle is put in a stopped state, according to whether a drive-motor rotating speed MN is lower than a threshold NMth. As such, since a determination as to whether a failure has occurred in the parking lock mechanism is judged when the hybrid type vehicle is put in a stopped state, a judgement to the effect that a failure has occurred is prevented from being erroneously passed.

When the hybrid type vehicle is put in a stopped state (Step S28-1: Yes), range judgment processing means (not shown) in the fail judgment processing means 91 subsequently performs, in Step S28-2, a range judgment processing to read a shift position SP as a sensor output from the shift position sensor 53 (FIG. 7) in order to judge whether the parking range has been selected on the basis of the shift position SP. When the parking range is selected (S28-2: Yes), position judgment processing means (not shown) in the fail judgment processing means 91 performs a position judgment processing to judge whether failure has occurred in the parking lock mechanism 18.

Therefore, in Step S28-3, the position judgment processing means reads a rotor position θM from the rotor position sensor 39 to calculate an initial position θs of the rotor 40 (FIG. 2) in terms of machine angle on the basis of the rotor position θM. Subsequently, when a preset period of time has elapsed, the position judgment processing means reads a rotor position θM again to calculate a present position θp of the drive motor 25 in terms of machine angle on the basis of the rotor position θM. The position judgment processing means then judges, in Step S28-4, whether the absolute value of a value, which is representative of a variation of the rotor position θM and obtained by subtracting the present position θp from the initial position θs, is greater than a threshold Δθ.

When the absolute value of a value, which is obtained by subtracting the present position θp from the initial position θs, is greater than the threshold Δθ (S28-4: Yes), the position judgment processing means judges that a failure has occurred in Step S28-5 in the parking lock mechanism 18. When the absolute value of a value, which is obtained by subtracting the present position θp from the initial position θs, is not greater than the threshold Δθ (S28-4: No), it is judged that the parking lock mechanism 18 is normal.

By the way, the parking gear Gp and the first counter drive gear 15 rotate integrally, the first counter drive gear 15 and the first counter driven gear 31 mesh with each other, the first counter driven gear 31 and the second counter driven gear 32 rotate integrally, and the second counter driven gear 32 and the second counter drive gear 27 mesh with each other. As such, when the parking gear Gp rotates an amount corresponding to a set of the tooth 59 and the valley 60, that is one pitch of the teeth 59, the rotor 40 rotates Θ in terms of machine angle.

$$\Theta = (1/Zp) \cdot 360 \cdot (Z15/Z31) \cdot (Z32/Z27)$$

where the number of teeth of the parking gear Gp is Zp and the respective numbers of teeth of the first counter drive gear 15, the first counter driven gear 31, the second counter driven gear 32, and the second counter drive gear 27, respectively, are Z15, Z31, Z32, and Z27.

When the parking gear Gp is caused to rotate at least one pitch of the teeth 59, the detent 58 and the tooth 59 do not abut against each other and the detent 58 is able to enter into the valley 60. As far as the parking lock mechanism 18 is normal, the rotor 40 does not rotate more than an angle Θ corresponding to one pitch of the teeth 59. Hereupon, when the rotor 40 is caused to rotate more than a threshold Δθ where the angle Θ is the threshold Δθ, or when the rotor 40 is caused to rotate more than a threshold Δθ where the threshold Δθ is an angle 2·Θ corresponding to two pitches of the teeth 59 in order to prevent erroneous detection, it is judged that a failure has occurred in the parking lock mechanism 18.

$$2 \cdot \Theta = (2/Zp) \cdot 360 \cdot (Z15/Z31) \cdot (Z32/Z27)$$

In this manner, when it is judged that a failure has occurred in the parking lock mechanism 18, fail-safe processing means (not shown) in the fail judgment processing means 91 performs a fail-safe processing in Step S28-6 to record a failure cord in the recording device of the vehicle control device 51 in order to perform a fail-safe operation in Step S28-7.

In the fail-safe operation, the fail-safe processing means drives the drive motor 25 to put the hybrid type vehicle in a stopped state so that the hybrid type vehicle does not move. Therefore, position control processing means (not shown) in the fail judgment processing means 91 performs a position control processing to read an initial position θs and a present position θp of the rotor position θM to perform a feedback control so that a deviation between the initial position θs and the present position θp becomes zero with the initial position θs as a target value.

In addition, it is also conceivable that the fail-safe processing means for suppression of movements of the hybrid type vehicle inhibits driving of the engine 11, the drive motor 25, and the electric generator 16. The fail-safe processing means is thus able to eliminate application of a foot brake and generation of an engine torque TE, a drive-motor torque TM, and an electric-generator torque TG. The fail-safe processing means can also use a drive-motor torque TM to cancel an engine torque TE or an electric-generator torque TG so as to eliminate transmission of the same to the driving wheels 37.

Subsequently, in Step S28-8, reset processing means (not shown) in the fail judgment processing means 91 performs a reset processing to judge whether a driver has performed a predetermined reset operation, and resets the fail-safe in the case where the driver has performed a predetermined reset operation.

In addition, it is judged according to the embodiment that the reset operation has been performed when a driver once turns an ignition key OFF and again turns the ignition key ON to effect reset, when a driver manipulates the shift lever to select another range, or the like.

In this manner, a rotor position θM of the drive motor 25 is used as an index of rotation and it is judged whether a failure has occurred in the parking lock mechanism 18 on the basis of a change in the index of rotation. The fact that a failure has occurred in the parking lock mechanism 18 can thus be surely detected even when the rotor 40 of the drive motor 25 rotates at a low speed and a drive-motor rotating speed NM cannot be correctly detected.

In addition, the invention is not limited to the embodiment described above but affords various modifications according to the gist of the invention and such various modifications are not excluded from the scope of the invention.

What is claimed is:

1. A vehicle, comprising:
    an electrically powered machine;
    a parking gear mechanically connected to the electrically powered machine;
    a parking lock mechanism that locks the parking gear;
    a sensor that detects a rotor position of the electrically powered machine; and
    a controller that:
        judges whether the electrically powered machine is put in a stopped state;
        reads the rotor position when a parking range is selected, if it is judged that the electrically powered machine is put in the stopped; and
        judges that a failure has occurred in the parking lock mechanism, if a change in the rotor position is greater than a threshold value.

2. The vehicle according to claim 1, wherein when the change in the rotor position is greater than the threshold value that corresponds to one pitch of a plurality of teeth of a gear provided on the parking gear, the controller judges that the failure has occurred in the parking lock mechanism.

3. The vehicle according to claim 1, wherein the controller performs a fail-safe operation for suppressing movements of the vehicle, when the failure has occurred in the parking lock mechanism.

4. The vehicle according to claim 3, wherein the controller effects reset from the fail-safe operation when a predetermined reset operation is performed.

5. The vehicle according to claim 1, wherein the parking gear is formed integrally with a ring gear.

6. The vehicle according to claim 1, wherein the controller judges that the electrically powered machine is in the stopped state when a vehicle speed is less than a threshold vehicle speed.

7. The vehicle according to claim 1, wherein when the parking range is selected, the controller reads an initial position of the rotor at a time when the parking range is initially selected and then reads a present position of the rotor after a preset period of time and judges that the failure has occurred when a difference between the initial position and the present position is greater than the threshold value.

8. The vehicle according to claim 7, wherein the threshold value corresponds to at least one pitch of a plurality of teeth of a gear provided on the parking gear.

9. The vehicle according to claim 7, wherein the threshold value corresponds to two pitches of a plurality of teeth of a gear provided on the parking gear.

10. A method of operating a vehicle, comprising:
    judging whether an electrically powered machine is put in a stopped state
    reading a rotor position of the electrically powered machine when a parking range is selected, if it is judged that the electrically powered machine is put in the stopped state; and
    judging that a failure has occurred in a parking lock mechanism that locks a parking gear mechanically connected to the electrically powered machine, if a change in the rotor position is greater than a threshold value.

11. The method according to claim 10, further comprising:

judging that the failure has occurred in the parking lock mechanism when the change in the rotor position is greater than the threshold value that corresponds to one pitch of a plurality of teeth of a gear provided on the parking gear.

12. The method according to claim 10, wherein a fail-safe operation is performed for suppressing movements of the vehicle, when the failure has occurred in the parking lock mechanism.

13. The method according to claim 12, wherein reset from the fail-safe operation is effected when a predetermined reset operation is performed.

14. The method according to claim 10, further comprising:

judging that the electrically powered machine is in the stopped state when a vehicle speed is less than a threshold vehicle speed.

15. The method according to claim 10, wherein when the parking range is selected, an initial position of the rotor is read at a time when the parking range is initially selected and then a present position of the rotor is read after a preset period of time and a judgment is made that the failure has occurred when a difference between the initial position and the present position is greater than the threshold value.

16. The method according to claim 15, wherein the threshold value corresponds to at least one pitch of a plurality of teeth of a gear provided on the parking gear.

17. The method according to claim 15, wherein the threshold value corresponds to two pitches of a plurality of teeth of a gear provided on the parking gear.

18. A vehicle control device, comprising:
a controller that:
judges whether an electrically powered machine is put in a stopped state;
reads a rotor position of the electrically powered machine when a parking range is selected, if it is judged that the electrically powered machine is put in the stopped state; and
judges that a failure has occurred in a parking lock mechanism, if a change in the rotor position is greater than a threshold value.

19. The vehicle control device according to claim 18, wherein when the change in the rotor position is greater than the threshold value that corresponds to one pitch of a plurality of teeth of a gear provided on the parking gear, the controller judges that the failure has occurred in the parking lock mechanism.

20. The vehicle control device according to claim 18, wherein the controller performs a fail-safe operation for suppressing movements of the vehicle, when the failure has occurred in the parking lock mechanism.

21. The vehicle control device according to claim 20, wherein the controller effects reset from the fail-safe operation when a predetermined reset operation is performed.

22. The vehicle control device according to claim 18, wherein the controller judges that the electrically powered machine is in the stopped state when a vehicle speed is less than a threshold vehicle speed.

23. The vehicle control device according to claim 18, wherein when the parking range is selected, the controller reads an initial position of the rotor at a time when the parking range is initially selected and then reads a present position of the rotor after a preset period of time and judges that the failure has occurred when a difference between the initial position and the present position is greater than the threshold value.

24. The vehicle control device according to claim 23, wherein the threshold value corresponds to at least one pitch of a plurality of teeth of a gear provided on the parking gear.

25. The vehicle control device according to claim 23, wherein the threshold value corresponds to two pitches of a plurality of teeth of a gear provided on the parking gear.

* * * * *